(12) United States Patent
Morris, III et al.

(10) Patent No.: US 7,174,724 B2
(45) Date of Patent: Feb. 13, 2007

(54) CHILLER WITH IMPROVED PRODUCT DISTRIBUTION

(75) Inventors: William F. Morris, III, Raleigh, NC (US); Terry A. Wright, Cary, NC (US); John P. Shell, Raleigh, NC (US); Robert E. Cathey, Hendersonville, NC (US)

(73) Assignee: Morris & Associates, Inc., Raleigh, NC (US)

( * ) Notice: Subject to any disclaimer, the term of this patent is extended or adjusted under 35 U.S.C. 154(b) by 81 days.

(21) Appl. No.: 11/100,802

(22) Filed: Apr. 7, 2005

(65) Prior Publication Data
US 2006/0225438 A1   Oct. 12, 2006

(51) Int. Cl.
*F25D 17/06*   (2006.01)

(52) U.S. Cl. ............. 62/64; 62/374; 62/381

(58) Field of Classification Search ........ 62/63, 62/64, 266, 310, 374–376, 381; 165/87, 165/92, 104.31, 109.1, 120; 134/159; 452/81, 452/197; 198/952
See application file for complete search history.

(56) References Cited

U.S. PATENT DOCUMENTS

| | | | | |
|---|---|---|---|---|
| 2,637,066 A * | 5/1953 | Johnson | | 99/517 |
| 2,779,052 A * | 1/1957 | Zebarth | | 62/348 |
| 2,942,429 A | 6/1960 | Van Dolah et al. | | 62/64 |
| 3,004,407 A | 10/1961 | Morris, Jr. | | 62/374 |
| 3,091,099 A | 5/1963 | Sharp | | 62/376 |
| 3,092,975 A | 6/1963 | Zebarth | | 62/63 |
| 3,097,501 A * | 7/1963 | Pappas | | 62/63 |
| 3,164,967 A | 1/1965 | Marshall | | 62/63 |
| 3,240,026 A | 3/1966 | Van Dolah et al. | | 62/63 |
| 3,250,086 A * | 5/1966 | Morris, Jr. | | 62/375 |
| 3,340,696 A | 9/1967 | Zebarth et al. | | 62/63 |
| 3,407,872 A | 10/1968 | Crane | | 165/109 |
| 3,426,546 A | 2/1969 | Crane | | 62/63 |
| 3,623,331 A | 11/1971 | Buyens | | 62/63 |
| 3,994,143 A | 11/1976 | Bonuchi et al. | | 62/317 |
| 4,138,860 A | 2/1979 | Drummond | | 62/375 |
| 4,277,954 A | 7/1981 | Drummond | | 62/375 |
| 4,388,811 A * | 6/1983 | Zebarth | | 62/63 |
| 4,788,831 A * | 12/1988 | Crawford et al. | | 62/374 |
| 4,860,554 A * | 8/1989 | Innes et al. | | 62/374 |

(Continued)

FOREIGN PATENT DOCUMENTS

BE   1006973 A6 *   2/1995

*Primary Examiner*—Mohammad M. Ali
(74) *Attorney, Agent, or Firm*—Thomas, Kayden, Horstemeyer & Risley, LLP (57) ABSTRACT

The chiller includes a semi-cylindrical tank (36) that conforms to the perimeter of its auger (38) so that the water can be raised to a water level (68) high above the auger shaft (44). Streams of water (84) are directed from the pulling side (80) across the lower portion of the tank beneath the auger shaft (44) to the dead side 82 of the tank at intervals along the tank so as to disperse the lower portion of the masses (23) of buoyant birds (22) from the more crowded pulling side (80) of the tank, beneath the auger shaft (44) toward the more vacant dead side (82) of the tank, thereby distributing the products more evenly throughout the tank and causing more water turbulence in the tank, thereby increasing the rate of heat transfer from the birds and avoiding having the birds cross over the auger shaft moving backward in chiller into a following flight of the auger.

17 Claims, 4 Drawing Sheets

U.S. PATENT DOCUMENTS

| | | |
|---|---|---|
| 5,868,000 A | 2/1999 | Morris, Jr. et al. ............ 62/374 |
| 6,167,709 B1 | 1/2001 | Caracciolo, Jr. et al. ......... 62/64 |
| 6,308,529 B1 | 10/2001 | Bass ............................ 62/381 |
| 6,578,370 B1 * | 6/2003 | Andress et al. ................. 62/64 |
| 6,658,886 B1 * | 12/2003 | Bass ............................ 62/381 |
| 6,722,490 B1 * | 4/2004 | Bass ............................ 198/657 |
| 6,835,126 B1 * | 12/2004 | Johnston et al. ............. 452/163 |
| 6,951,273 B2 * | 10/2005 | Bass ............................ 198/657 |
| 2001/0025495 A1 | 10/2001 | Newman et al. ................ 62/63 |

\* cited by examiner

(Prior Art)

Fig. 1

(Prior Art)

CHILLER WITH IMPROVED PRODUCT DISTRIBUTION

FIELD OF THE INVENTION

This invention involves chillers for reducing the temperature of whole birds that have been defeathered, eviscerated and otherwise prepared for human consumption. More particularly, the invention concerns an auger type poultry chiller in which the massing or "clumping" of birds on one side of the auger tank and the movement of the birds over the auger shaft are reduced.

BACKGROUND OF THE INVENTION

Food chillers, such as the auger type poultry chillers, are used in poultry processing plants for reducing the temperature of the birds after the birds have come off the processing line and have been defeathered, eviscerated and otherwise have been made oven-ready, for packaging and shipment to the consumers.

A typical auger type poultry chiller includes an elongated, half-cylindrical tank having a rotary auger placed therein. Water is placed in the tank and is recirculated through a cooling system such as a refrigeration system, with the water directed to a first end of the tank and reclaimed at a second end of the tank. Birds are placed in the tank at its second end and the birds are advanced by rotation of the auger toward the first end. The auger typically rotates at one revolution for every three to five minutes. This arrangement moves the water in a counter flow relationship with respect to the movement of the birds, so that the birds are contacted by the coldest water at the delivery end of the tank.

This type of poultry chiller is generally known in the prior art, as exemplified by U.S. Pat. Nos. 5,868,000 and 6,308,529.

One of the phenomena of the prior art poultry chillers is that the birds tend to migrate from one lateral side of the auger shaft (the "dead" side of the tank) to the other lateral side of the auger shaft (the "pulling" side of the tank) as the birds advance along the length of the tank. The conditions that cause the phenomena is that as the water in the tank moves along the length of the tank a large percentage of the water flows about the perimeter of the auger blades, between the blades and the side of the tank. The birds in the water tend to follow the water toward the perimeter of the auger blades and into contact with the auger blades. When the birds contact the auger blades the rotary motion of the auger blades urges the birds from the dead side to the pulling side of the tank. The auger blades move in an arcuate path first downwardly into the water through the dead side of the tank, then beneath the auger shaft, and then upwardly on the pulling side of the auger shaft and then out of the water in the tank. The birds tend to follow this movement to the pulling side of the tank until the blades reach the surface of the water at the pulling side of the tank. Then the buoyancy of the birds and the movement of the water between the perimeter of the auger blades and the side of the tank tend to hold the birds there. This usually results in most of the birds at each auger flight forming a mass or "clump" of birds on the pulling side of the tank, at the side wall of the tank, at the surface of the water.

This accumulation of birds in a relatively dense mass on the crowded pulling side of the auger shaft tends to reduce the chilling effect of the water against the birds. The birds in the mass are so densely packed next to one another compared to the surrounding water that the chilling capacity of the water about the mass of birds is substantially reduced.

Another effect of the massing of the birds as described above is that there is less circulation of the water among the birds. It is well known that the rapid circulation of chilled water about the birds results in a more rapid removal of heat from the birds.

The water level in the prior art chiller tanks usually is maintained at or only slightly higher than the height of the shaft of the auger. The shaft functions as a dam to prevent the birds in the mass of birds on the pulling side of the tank from moving across the shaft into the space behind the auger.

Figure 1:
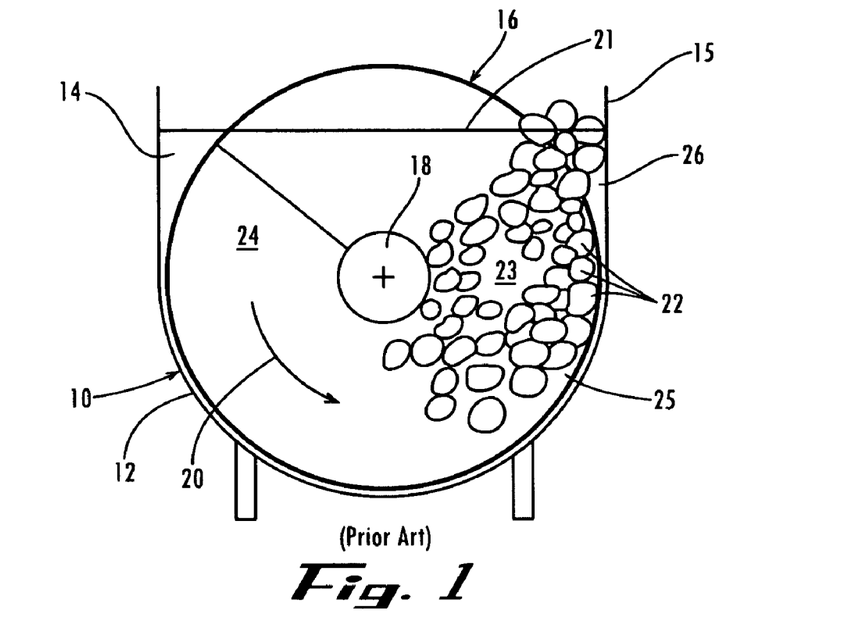
FIG. 1 is an end cross-sectional view of a prior art poultry chiller, showing a one-half cylinder tank.

In order to increase the load capacity of a poultry chiller, additional water can be added to the tank. FIG. 1 of the drawings shows a prior art poultry chiller that is filled with water to a level above the auger shaft. The chiller tank 10 is a one-half cylinder tank that has a lower portion 12 in the form of a one-half cylinder and vertical wall extensions 14 and 15. The water level is shown at 21. The helical auger blade 16 in the tank is rotated on its auger shaft 18 in the direction as indicated by arrow 20, inducing the birds 22 to move laterally from the dead side 24, beneath the auger shaft 18, to the pulling side 25 of the chiller tank 10. In this example the water level 21 is higher than the shaft 18. When the birds move to a level in the water adjacent the side wall of the tank that is higher than the auger shaft 18, those birds adjacent the side wall of the tank eventually reach an approximately triangular shaped gap 26 where the vertical extension 15 of the one-half cylinder tank 12 diverges from the circular perimeter of the helical auger blade 16. The water moving through the gap induces any birds that are suspended near the water level 21 and adjacent the vertical wall extension to move from the pulling flight to the following flight of the auger. This results in some of the birds falling behind by one auger segment and spending a longer time than necessary in the tank.

Figure 2:
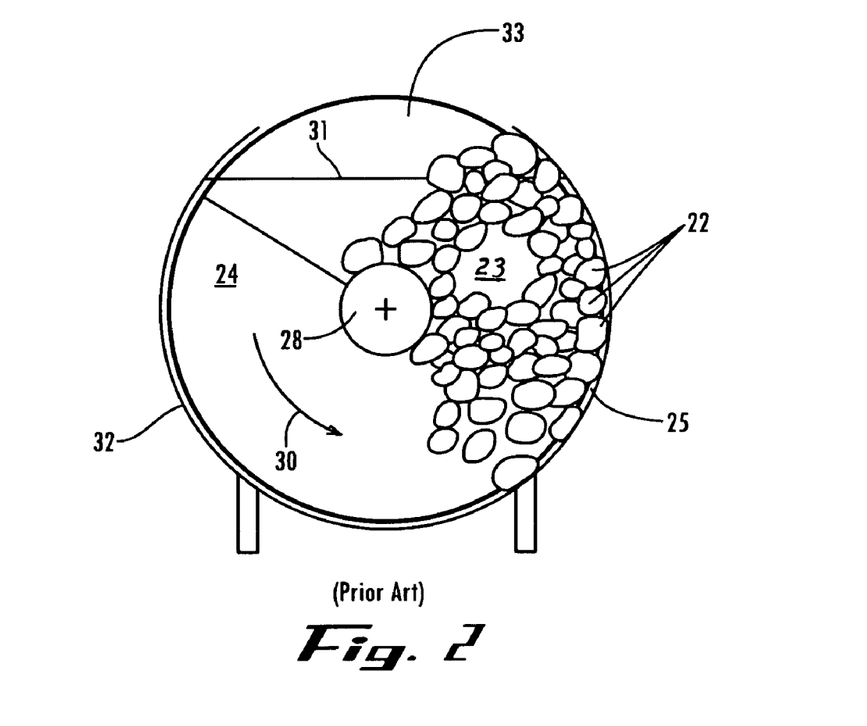
FIG. 2 is an end view of another prior art chiller showing a semi-cylindrical tank.
Figure 3:
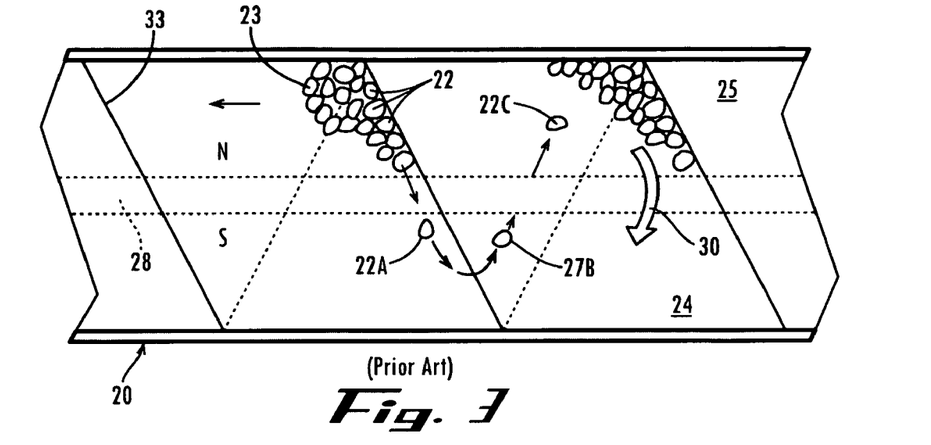
FIG. 3 is a plan view of a segment of a prior art chiller tank and its auger, with the movement of the birds crossing over the auger shaft illustrated.

As shown in FIGS. 2 and 3, a solution to the loss of birds from one auger flight to the following auger flight in a high water situation through a triangular shaped gap, such as the gap 26 of FIG. 1, was to eliminate the triangular gap. This was accomplished by making the one-half cylinder chiller tank more nearly cylindrical, as shown by the tank 32. The vertical wall extensions of FIG. 1 were wrapped about the auger. But if high water is used in the chiller tank of FIG. 2 as shown by water level 31, there is a hazard that some of the birds 22 that accumulate on the pulling side of the tank will float over the auger shaft 28. If birds should inadvertently cross over the auger shaft 28 by the over-filling of the tank with water and by the accumulation of too many birds on the pulling side of the tank, the birds crossing the shaft will fall behind in the next flight of the auger. This is illustrated in FIG. 3 where the solid lines of the auger 33 illustrate the upper portions of auger positioned above the water level and the dashed lines of the auger 33 illustrate the lower portions of the auger positioned below the water level. The birds 22A, 22B, and 22C have moved away from their mass of birds 23 and crossed over the auger shaft 28. Once the bird shown at 22A crosses the auger shaft it enters the dead side of the tank, and the contact of the downwardly moving surface of the auger against the bird on the dead side of the tank tends to move the bird from position 22A toward 22B and eventually under the auger shaft 28 to position 22C. This results in the birds falling behind to the next accumulation of birds and the birds remain in the chiller an additional 3 to 5 minutes, which is longer than the time required for chilling the bird. It also places extra birds in the following auger flight so that the chilling efficiency of the following auger flight tends to be reduced.

Another problem in the birds falling behind to a following auger flight in a prior art bird chiller is created when the entire poultry processing line is progressively shut down for a work break. The delivery of birds to the chiller is interrupted for a certain time interval, such as 18 minutes, so the birds previously delivered to the chiller can move on through the chiller but the absence of incoming birds creates a gap in the line of birds to be processed by the following work stations. When the last birds are removed from the tank the following process stations have no birds to process and the workers at the following work stations have the opportunity to take a work break.

However, if the birds in the chiller have fallen behind to the next auger segment, the birds will continue to be delivered from the chiller to the following work stations for a longer time, so that the workers down stream from the chiller do not have as much time on their work break. Even if the operation of the chiller is not interrupted for a work break, the non-uniform delivery of birds from the chiller reduces the efficiency of the following processing line.

It is to the above noted problems that this invention is directed.

SUMMARY OF THE INVENTION

Briefly described, the present invention comprises an improved poultry chiller with a rotary auger for efficiently reducing the temperature of birds that have been processed for human consumption. The chiller has the ability to handle more birds by increasing the rate of temperature transfer from the birds. The invention tends to reduce the extensive accumulation of birds on the pulling side of the chiller tank that has the hazard of causing bird cross-over from one flight of the auger to the trailing flight of the auger. The invention provides tighter control of chilling time for each bird and better management of feed rate to downstream processing.

An embodiment of the chiller includes an elongated, more than one-half cylindrical tank, an auger in the tank, the auger having an auger shaft parallel to the length of the tank and a helical auger blade having auger flights extending about the auger shaft. The auger flights each have an approximately helical surface such that when the tank is filled with water and birds are placed in the water and the auger is rotated, the helical surface of each auger flight moves in an arcuate path through the water, downwardly on the dead side of the auger shaft, laterally beneath the auger shaft and upwardly on the pulling side of said auger shaft. This tends to advance and lift the buoyant birds in the water along the elongated tank such that most of the birds tend to move laterally beneath the auger shaft from the dead side of the auger shaft to the pulling side of the auger shaft and tend to accumulate in masses of buoyant birds that move along the tank at the surface of the water on the pulling side of said auger shaft.

In order to avoid the excessive accumulation of birds on the pulling side of the tank, nozzles are positioned at the side wall of the tank on the pulling side of the auger shaft and are oriented for moving streams of water laterally into the water in the tank. The streams of water are directed from the pulling side of the tank, below the auger shaft, generally parallel to the surfaces of the auger, and toward the dead side of the tank. The streams of water tend to keep birds away from the pulling side of the tank and tend to remove some of the birds from the masses of buoyant birds on the pulling side of the tank, by moving the birds below the auger shaft and toward the dead side of the tank. This spreads the birds toward the dead side of the tank where there are fewer birds, thereby increasing the rate of cooling of the birds on both sides of the tank.

The tank of the chiller is more than half cylindrical so as to have its cylindrical shape continue partially around the upper half of the auger. This avoids the creation of the triangular shaped gaps 26 between the flights of the auger and the side of the tank as shown in FIG. 1, and allows the level of water in the tank to be raised. The additional volume of water in the tank allows more birds to be processed through the tank.

The reduction of the accumulation of masses of the birds on one side of the auger spreads the birds from one another and increases the rate of heat transfer from the birds, and allows more birds to be accommodated in the chiller. This also allows the water level to be raised without increased hazard of the birds moving over the auger shaft, thereby allowing even more birds to be accommodated in the chiller.

Thus, it is an object of this invention to provide a chiller with improved bird distribution in the chiller tank, and to increase the rate of heat transfer from the birds while reducing the hazard of cross-over of the birds from one auger flight to the following auger flight.

Another object of this invention is to provide a more efficient chiller for oven-ready birds, that has an increased production capacity for chilling the products without enlarging the footprint of the chiller in the work space.

Other objects, features and advantages of the present invention will become apparent upon reading the following specification, when taken in conjunction with the accompanying drawings.

DETAILED DESCRIPTION OF THE PREFERRED EMBODIMENT

Figure 4:
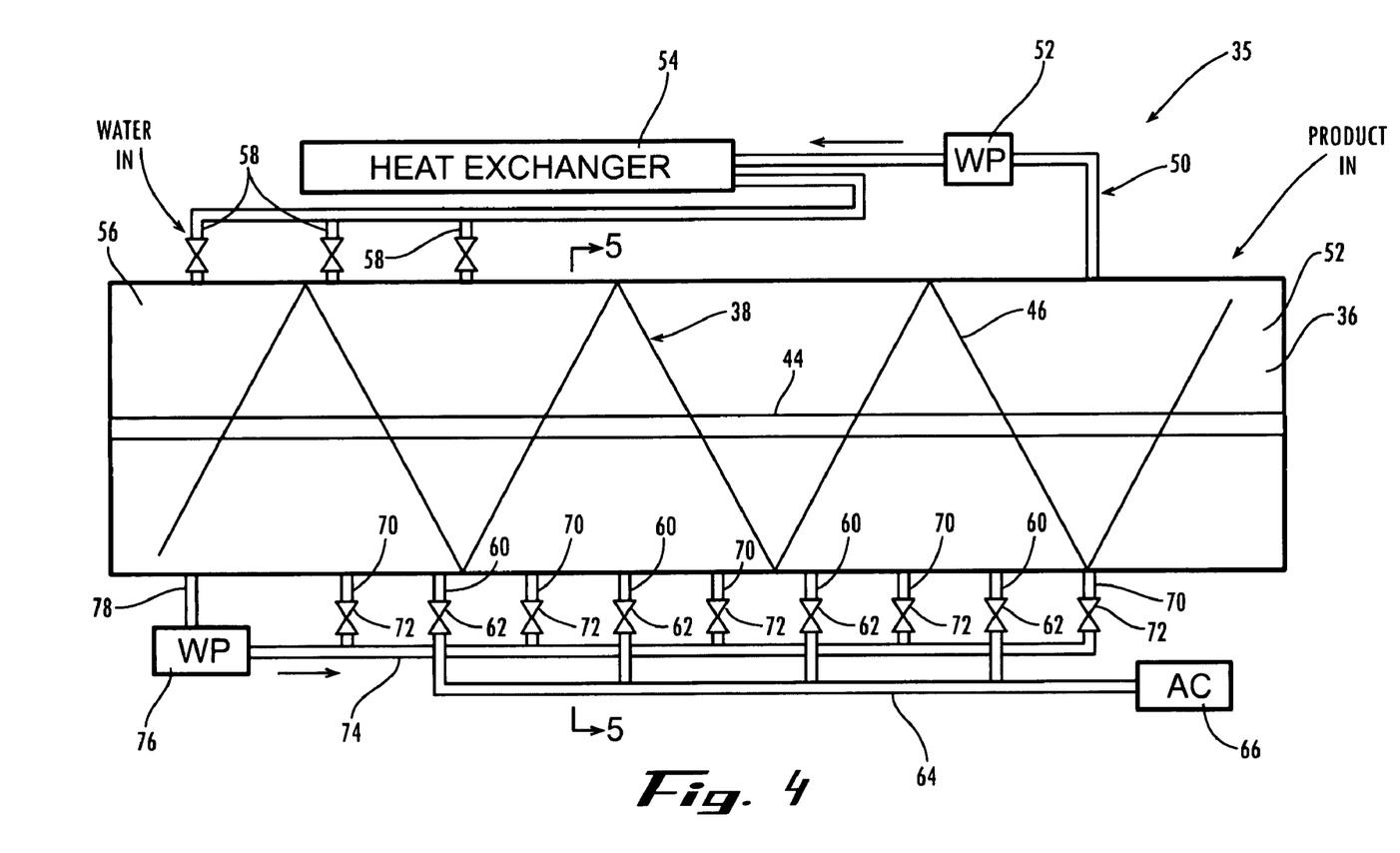
FIG. 4 is a plan view of the chiller with improved bird distribution.
Figure 5:
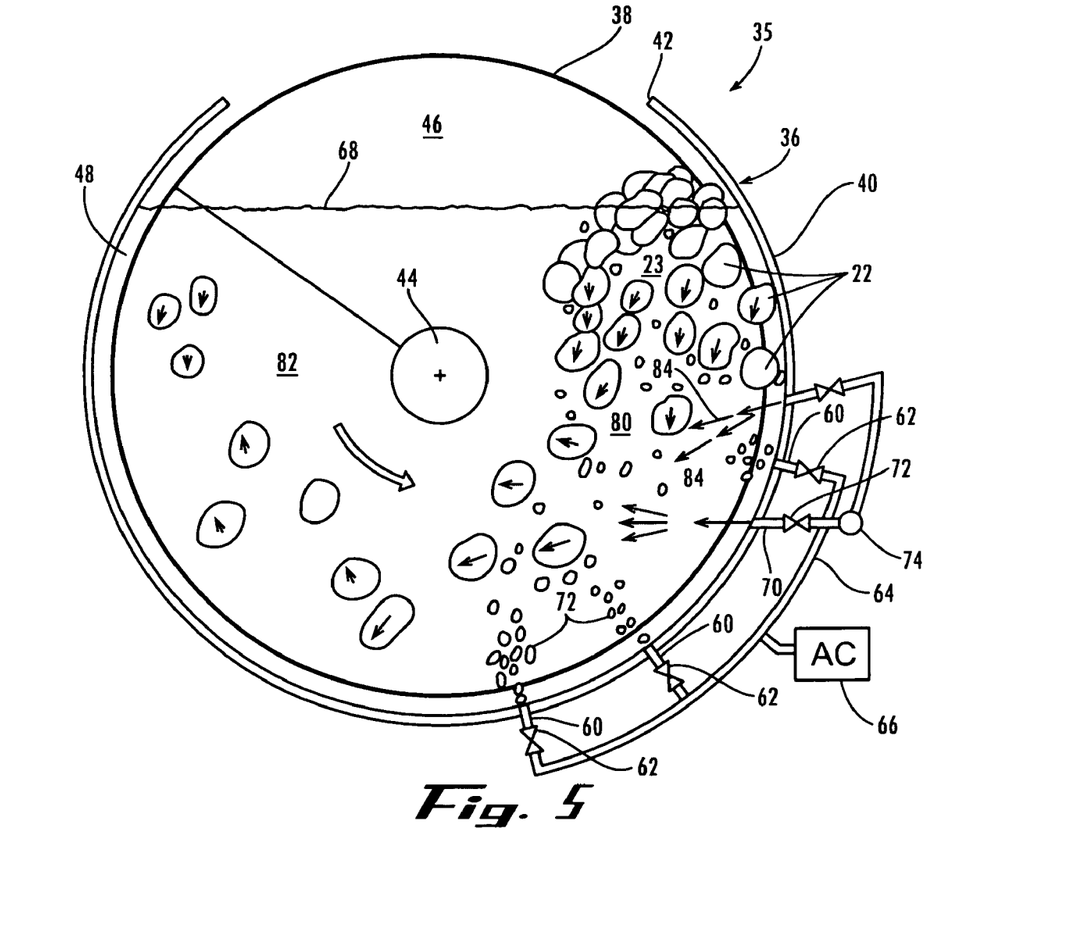
FIG. 5 is an end cross-sectional view of the chiller with improved bird distribution.

Referring now in more detail to the drawings, in which like numerals indicate like parts throughout the several views, FIGS. 4 and 5 illustrate a poultry chiller 35 having an elongated tank 36 and an auger 38 in the tank. The tank has a semi-cylindrical side wall 40 that has an opening 42 at its upper portion. In the embodiment shown, the semi-cylindrical side wall extends approximately 290° about the auger 38, with the tank opening 42 extending the remaining approximately 70°. Other degrees of tank extensions about the auger may be used as may be desired. The helical auger 38 is centrally located within the semi-cylindrical side wall 40 with the auger shaft 44 being substantially coextensive with respect to the center line of the semi-cylindrical side wall 40 of the tank. The auger includes a helical blade 46 formed in several flights (not shown) that are supported by and surround auger shaft 44, with the auger blade extending out closely adjacent the semi-cylindrical side wall 40 of the tank 36. The gap 48 between the perimeter of the helical auger blade 46 and the facing surface of the semi-cylindrical side wall 40 of the tank is substantially less than the breadth of a typical bird 22 that is to be processed by the poultry chiller 35. This prevents the birds from passing between the perimeter of the helical auger blade and the facing surface of the semi-cylindrical side wall 40. However, the gap 48 allows water to pass about the perimeter of the auger blade, between the perimeter and the side wall of the tank. It is also possible to construct the auger blades so that water passages are formed in the blades that extend radially from adjacent the auger shaft to the perimeter of the blade. This is disclosed in U.S. Pat. No. 6,308,529, the disclosure of which is incorporated herein in its entirety by reference.

As shown in FIG. 4, the tank 36 contains water that is continuously recirculated through a recirculation system 50. A water pump 52 removes water from the product inlet end, moves the water through a heat exchanger 54 that reduces the temperature of the water, and then introduces the chilled water at the water inlet end 56. Usually, several inlet conduits 58 are used to introduce the rechilled water into the tank 36.

Helical auger 38 maybe formed in several flights (not shown) so as to accommodate supports for the auger shaft. This is illustrated in U.S. Pat. No. 6,722,490 which is incorporated herein in its entirety by reference. The auger typically rotates at one revolution per three to five minutes, in a direction that moves the bird from the product inlet end 52 toward the opposite end 56, while the water is moved into the water inlet end 56 and migrates toward the end 52. This counter flow relationship results in the coldest water making initial contact with the birds that have already been pre-chilled by movement along the poultry chiller.

In order to enhance the contact of the chilled water with the surfaces of the birds 22, air nozzles 60 may be mounted to the semi-cylindrical side wall 40 of the tank 36. The nozzles communicate through control valves 62 with an air conduit 64. An air compressor 66 provides air under pressure to the air conduit, through the control valves, to the air nozzles 60. When the tank 36 is filled with water to the water level 68, the infusion of air through the air nozzles 60 into the water generates rapidly rising air bubbles 72. The air nozzles 60 are located in the lower portion of the semi-cylindrical side wall 40 of the tank 36, on the pulling side of auger shaft 44 where the birds 22 tend to accumulate. The bubbles of water tend to disturb the birds 22, and to create turbulence in the water about the birds, therefore enhancing the rate of heat transfer between the birds and the water.

The air nozzles 60 communicate through the semi-cylindrical side wall 40 of the tank of the chiller 35 at intervals along the length of the tank (FIG. 4), and also are radially spaced about the lower quadrant of the tank (FIG. 5). This assures that the circulation of water among the birds that have accumulated in a mass of birds is maintained. Each nozzle may have its own control valve 62.

Figure 6:
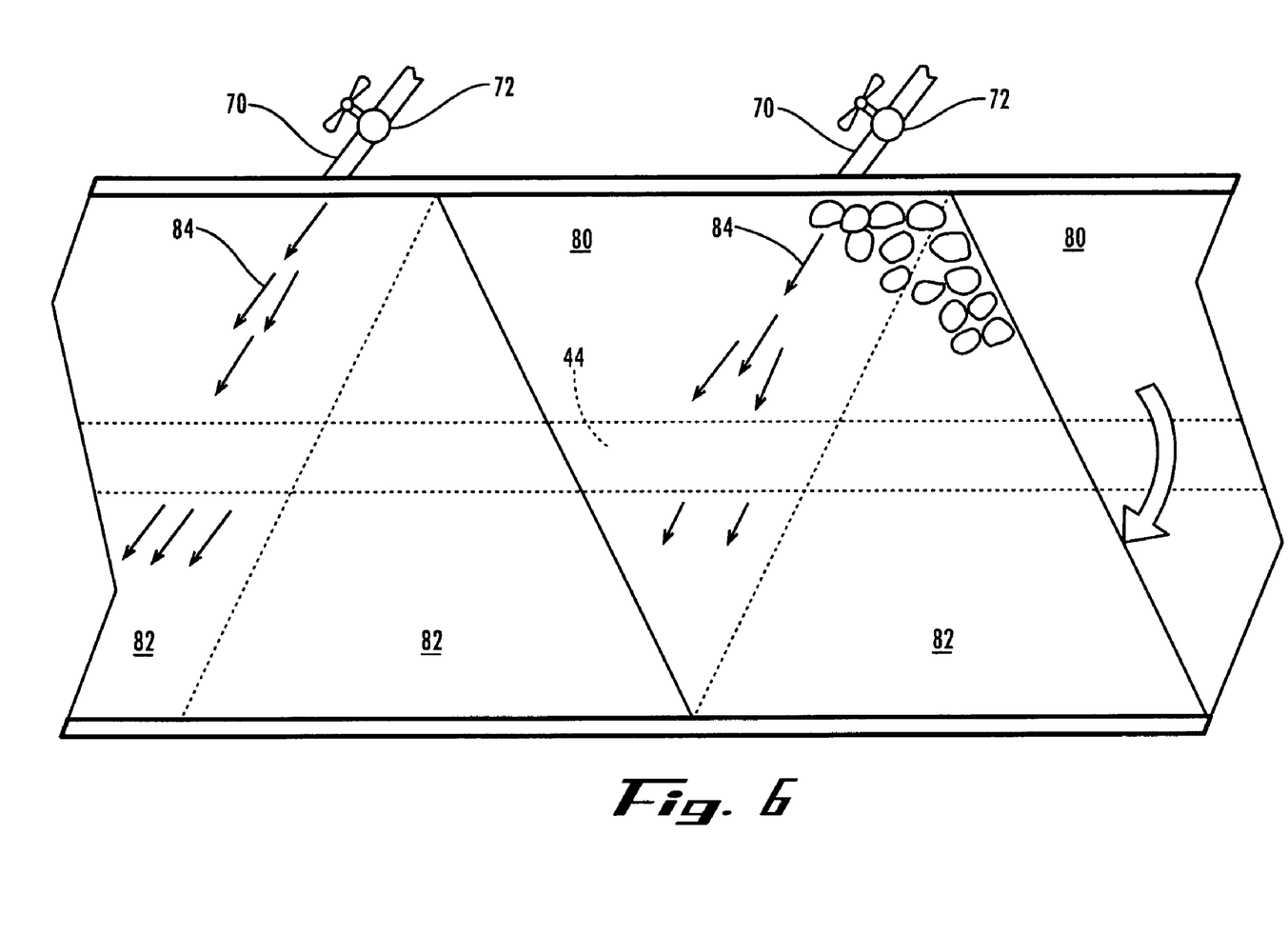
FIG. 6 is a plan view of a portion of the chiller tank and auger, showing the direction of the water streams emitted from the nozzles at the pulling side of the tank.

Water nozzles 70 also communicate through the semi-cylindrical side wall 40 of the tank of the chiller 35. As shown in FIGS. 4 and 6, the water nozzles are spaced along the length of the tank 36, and each nozzle may include its own control valve 72 that communicates with a header 74. A water pump 76 is connected by inlet pipe 78 to the tank 36 at the cold water end of the tank. The water pump moves water from the cold end of the tank to each of the nozzles 70, and as shown in FIGS. 5 and 6, the nozzles in turn inject water in streams 84 laterally through the tank from the more crowded pulling side of the tank 80, beneath the auger shaft 44, to the more vacant dead side of the tank 82. The nozzles 70 are also spaced at intervals along the length of the tank 36 So that there will be several streams of water injected into the tank to move the birds. The nozzles direct the streams of water 84 parallel to the auger blades, as shown in FIG. 6, and beneath the auger shaft 44, as shown in FIG. 5, and the streams tend to follow the curvature of the bottom of the tank until dissipated beyond the auger shaft, moving the birds in the same general directions. In the meantime, the air bubbles 72 move upwardly about the streams of water.

The stream of water 84 from each nozzle 70 tends to impinge against the lower portion of the mass of buoyant birds that may have accumulated on the crowded side of the tank and to disperse the buoyant birds from the lower portion of the masses, laterally beneath the auger shaft 44 toward the vacant side of the tank 82.

As the lower portion of the masses of birds are redistributed laterally beneath the auger shaft, the buoyancy formerly provided from the now displaced birds to the birds above is removed so that the birds in the upper portion of the crowded side of the tank are freer to move downwardly under the influence of gravity. As shown by the birds 22 near the lower portion of the mass of birds that have the downward extending arrows, these birds tend to move downwardly as the birds above the waterline 68 apply their weight through force of gravity. This downward movement of the upper birds relieves the tendency of the birds from passing over the auger shaft 44 into the trailing flight of the auger, as illustrated in FIGS. 2 and 3.

In addition, the turbulence provided by the water stream 84 provides more surface contact of the chilled water with the surfaces of the birds being moved, thereby increasing the heat transfer from the birds. Moreover, the removal of the lower portion of the mass of birds from the crowded side of the tank provides more water contact to the birds above, thereby tending to increase the rate of heat transfer from these birds.

While the foregoing specification refers to the liquid in the tank as being water, it will be understood by those skilled in the art that other ingredients can be included in the water, and the term "water" is to be construed as including other liquids.

The foregoing poultry chiller has the ability to process more birds without increasing the hazard of the birds moving to a following auger flight, and has the ability to disperse the birds in the tank generally from the crowded side of the tank to the vacant side of the tank, and to tumble the birds more vigorously. This tends to increase the rate of heat transfer from the birds, and also the exposure to water in a turbulent environment tends to allow the birds to pick up additional moisture. The capacity of the chiller for birds is increased substantially over the prior art chillers with the same size footprint. For example, the chiller disclosed herein is capable of increasing the weight of birds processed in the chiller from approximately 700 lbs. of birds per linear foot of the tank to up to approximately 1000 lbs. per linear foot of tank for a 8 foot diameter tank.

In order to induce the displacement of the birds laterally from the crowded portion of the tank, beneath the auger shaft 44, to the dead portion 82 of the tank, the nozzles are directed laterally to the lower portions of the masses of the birds and the volume and velocity of the water in the streams must be sufficient to displace the birds. The volume and velocity of the water that functions adequately to displace the birds in an 8 foot diameter tank is about 70 gallons per minute, at 35 feet per second. For larger diameter tanks, the volume and velocity of the water streams may be increased. For example, for a 12 foot diameter tank, the volume and velocity of the water that functions adequately for displacing the birds is about 90 gpm and 35 fps. Other volumes and velocities may be used as desired.

Some of the birds removed from the pulling side of the tank to the dead side of the tank by the water streams tend to return to the pulling side of the tank. However, since the water streams are introduced to the tank at several intervals along the tank, and since the birds are continuously advanced along the tank, the birds pass several water nozzles so that the return of the birds to the pulling side of the tank is retarded. Repeated impingement of water at the several locations of the nozzles along the length of the tank is effective to assure that the birds do not overcrowd the pulling side of the tank.

While the term "bird" has been used in the forgoing description, it should be understood that other products may be cooled in the disclosed chiller, as may be desired.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A chiller for reducing the temperature of buoyant birds comprising:
    an elongated tank having a semi-cylindrical side wall defining a central tank axis, said semi-cylindrical side wall extending higher than said central tank axis for holding chilled water with a water level higher than said central tank axis,
    an auger in said tank, said auger having an auger shaft substantially coextensive with said central tank axis and a helical blade having flights extending about said auger shaft and extending to the semi-cylindrical side wall of said tank, such that when the tank is filled with water and the auger is rotated, the birds in the water are moved along the tank and are moved from a dead side of the tank to a pulling side of the tank such that the majority of birds tend to accumulate in masses of birds at each flight of the auger, at the surface of the water, and on the pulling side of said tank,
    a water supply system in communication with said tank for chilling water and recirculating chilled water through said tank and maintaining water above the axis of rotation of said auger,
    at least one nozzle positioned at said side wall of said tank oriented for directing a stream of water into the water in said tank and toward the masses of buoyant birds accumulated in said tank to disperse some of the birds from the masses of birds,
    said nozzle oriented to direct the stream of water from the pulling side of the tank, beneath the auger shaft, and into the dead side of the tank, such that birds are urged by the stream of water toward the dead side of the tank.

2. The chiller of claim 1, and further including
   a pump having an inlet in communication with said tank and configured for supplying the nozzle with water from said tank, such that some of said water in said tank is recirculated through said nozzle.

3. The chiller of claim 1, wherein
   said nozzle is directed laterally across said tank and substantially parallel to the auger flights.

4. The chiller of claim 1, wherein
   said nozzle is positioned to disperse the lower portions of the masses of the accumulated birds.

5. The chiller of claim 1, wherein
   said at least one nozzle comprises a plurality of nozzles spaced along the length of said tank on the side of the tank where the buoyant birds tend to accumulate.

6. A method for reducing the temperature of birds, comprising
   depositing a plurality of birds in an elongated tank filled with water,
   reducing the temperature of the water in the tank,
   urging buoyant birds with the pushing surfaces of the flights of an auger through the water and along the tank,
   accumulating masses of the buoyant birds at the intersection of the surface of the water and the pushing surfaces of the flights of the auger,
   directing a stream of water into the masses of the buoyant birds as the masses of buoyant birds move with the auger and dispersing at least some of the buoyant birds from masses of buoyant birds with the stream of water.

7. The method of claim 6,
   and further including the step of injecting air into the water in the tank, and
   wherein the step of directing a stream of water into the masses of the buoyant products as the masses of buoyant birds move with the auger comprises moving the accumulated masses of the buoyant birds with the flights of the auger past a series of water nozzles and air nozzles.

8. The method of claim 6, wherein
   the step of directing the stream of water into the masses of the buoyant birds comprises directing the stream of water into the tank between each of the flights of the auger.

9. The method of claim 7, wherein
   the step of directing the stream of water into the masses of buoyant birds includes the step of orienting the nozzle to direct the stream of water below the auger shaft.

10. The method of claim 6, wherein
    the step of directing the stream of water into the masses of the buoyant birds comprises chilling the stream of water.

11. A chiller for reducing the temperature of buoyant birds comprising:
    an elongated tank,
    an auger in said tank,
    said auger having an auger shaft parallel to the length of said tank and a helical blade having auger flights extending about said auger shaft,
    said auger flights each having a helical surface such that when the tank is filled with water and birds are placed in the water and the auger is rotated, the helical surface of each said auger flight moves downwardly on a dead side of said tank and upwardly on a pulling side of said tank and tends to advance and lift the buoyant birds in the water along the pulling side of said tank such that some of the buoyant birds tend to move laterally beneath said auger shaft from said dead side of said tank to the pulling side of said tank and accumulate in masses of birds in the pulling side of the tank at the level of the water,
    a series of nozzles positioned at said side wall on said pulling side of said tank and oriented for directing a stream of water laterally into the water in said tank from said pulling side of said tank and below said auger shaft and toward said dead side of said tank to remove some of the birds from the masses of birds on said pulling side of tank.

12. The chiller of claim 11, wherein
said nozzles are configured to recirculate chilled water in said tank.

13. The chiller of claim 11, wherein
said nozzles are spaced along the length of said tank, such that the accumulated masses of birds are moved progressively from nozzle-to-nozzle.

14. A chiller for reducing the temperature of buoyant birds comprising:
an elongated tank having a side wall for containing chilled water,
an auger in said tank having an auger shaft parallel to the length of said tank and a helical blade having auger flights extending about said auger shaft toward said side wall for moving the birds through the chilled water in said tank,
said tank being configured to maintain a water level higher than said auger shaft, and said at least one nozzle positioned at said side wall of said tank oriented for directing a stream of water laterally beneath said auger shaft from one lateral side of said auger shaft to the other lateral side of said auger shaft to move the birds through the water laterally beneath the auger shaft.

15. The chiller of claim 14, wherein
said nozzle is configured to recirculate chilled water in said tank.

16. The chiller of claim 14, wherein
said nozzle comprises a plurality of nozzles at spaced intervals along said side wall of said chiller.

17. The chiller of claim 14, wherein
said tank has a dead side on one lateral side of said auger shaft and a pulling side on the other side of said auger shaft such that the auger moves birds from the dead side to the pulling side and advances the birds along said pulling side of the tank and masses the birds at the water level on said pulling side,
said nozzle comprises a plurality of nozzles spaced along said pulling side of said tank and is oriented to direct streams of water from said pulling side to the dead side of said tank and move birds to the dead side of said tank.

* * * * *